United States Patent [19]

Brown

[11] Patent Number: 4,480,450
[45] Date of Patent: Nov. 6, 1984

[54] ANTI-THEFT DEVICE FOR EYELET TYPE TRAILER HITCHES

[76] Inventor: Herschel J. Brown, 2330 W. Arata Rd., Space 51, Troutdale, Oreg. 97060

[21] Appl. No.: 523,140

[22] Filed: Sep. 9, 1983

Related U.S. Application Data

[63] Continuation of Ser. No. 255,758, Apr. 20, 1981.

[51] Int. Cl.³ .................... E05B 67/22; E05B 73/00
[52] U.S. Cl. ................................................ 70/14; 70/39
[58] Field of Search ............... 70/14, 34, 57, 58, 19, 70/258, 32, 33, 39; 280/507

[56] References Cited

U.S. PATENT DOCUMENTS

| Re. 28,187 | 10/1974 | Longenecker | 280/507 |
|---|---|---|---|
| 1,728,612 | 9/1929 | Johnson | 70/39 |
| 2,983,133 | 5/1961 | Hruby | 70/39 |
| 3,844,143 | 10/1974 | Hudson | 70/14 |
| 4,112,716 | 9/1978 | Wippich | 70/39 X |
| 4,186,575 | 2/1980 | Bulle | 70/14 |
| 4,440,005 | 4/1984 | Bulle | 70/34 X |

FOREIGN PATENT DOCUMENTS

| 861059 | 7/1949 | Fed. Rep. of Germany | 70/14 |
|---|---|---|---|
| 2510482 | 9/1976 | Fed. Rep. of Germany | 70/58 |
| 2725470 | 12/1978 | Fed. Rep. of Germany | 70/58 |
| 2911883 | 10/1980 | Fed. Rep. of Germany | 70/258 |

Primary Examiner—Robert L. Wolfe
Assistant Examiner—Lloyd A. Gall
Attorney, Agent, or Firm—Oliver D. Olson

[57] ABSTRACT

The eyelet opening of an eyelet-type trailer hitch is intercepted by a plug comprising two cap sections of sufficient size to overlie the opposite ends of the eyelet opening without passing through, each section mounting one component of a padlock in which the bail component is completely removable from the padlock body component. Secured to each cap section is a shielding sleeve surrounding the associated padlock component and configured to extend into the eyelet opening. When the padlock components are put into locking engagement through the eyelet opening, the cap sections are releasably secured together to block said opening against the insertion of an associated latch component of the hitch.

2 Claims, 3 Drawing Figures

ANTI-THEFT DEVICE FOR EYELET TYPE TRAILER HITCHES

This application is a continuation of application Ser. No. 255,758, filed Apr. 20, 1981.

BACKGROUND OF THE INVENTION

This invention relates to eyelet type trailer hitches, and more particularly to a device for lockably preventing connection of a corresponding latch component to the eyelet.

It has been the experience that cargo trailers being stored in yards are quite vulnerable to theft by persons with a tractor having a latch component which engages the conventional eyelet component incorporated on such trailers. This is a major problem in yards where trailers are moved in and out in great numbers, and presently the only solution involves the expense of security personnel.

Applicant is aware of efforts made in the protection of trailers in the locking of fifth wheel couplers and ball-and-socket couplers, but is aware of no devices for the prevention of the coupling of conventional latch components with their corresponding eyelet components.

SUMMARY OF THE INVENTION

In its basic concept, this invention provides an anti-theft device for eyelet type trailer hitches in which a member is arranged to releasably intercept the opening in the eyelet component to preclude the entrance of the associated latch component.

It is by virtue of the foregoing basic concept that the principal objective of this invention is achieved; namely, to prevent unauthorized coupling of the components of eyelet type trailer hitches.

Another object of this invention is the provision of an anti-theft device of the class described in which the locking mechanism is protected from tampering or damage.

A further object of this invention is the provision of an anti-theft device for the class described which is of simplified construction for economical manufacture.

The foregoing and other objects and advantages of this invention will appear from the following detailed description, taken in connection with the accompanying drawing of a preferred embodiment.

DESCRIPTION OF THE PREFERRED EMBODIMENT

Figure 1:
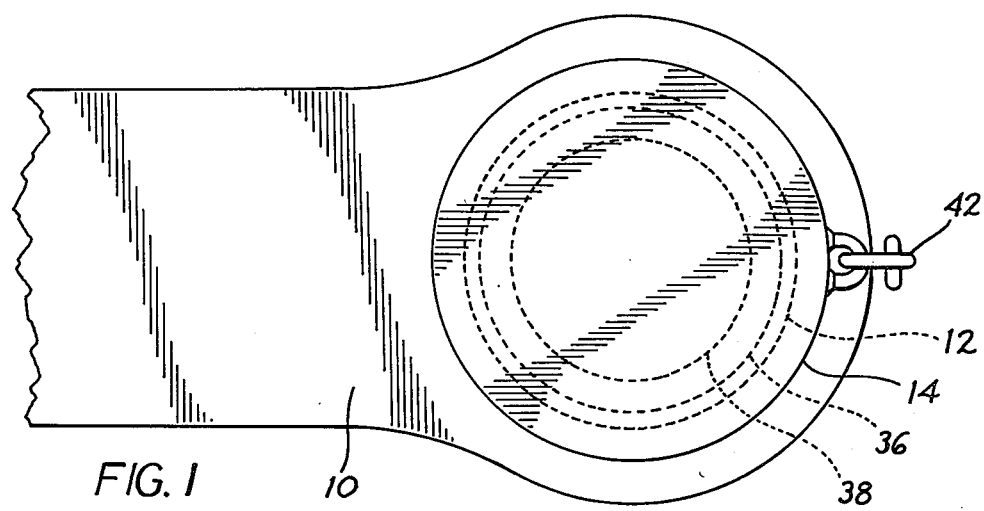
FIG. 1 is a fragmentary plan view of the eyelet component of an eyelet type trailer hitch having installed in the opening of the eyelet an anti-theft device embodying the features of this invention.
Figure 2:
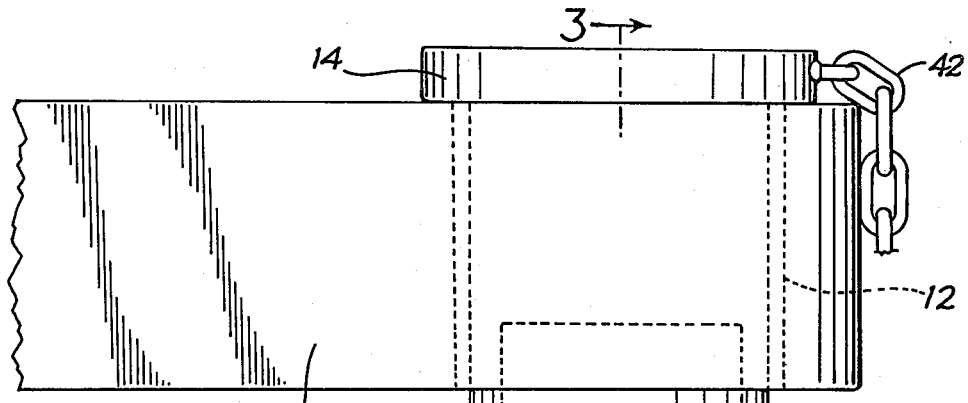
FIG. 2 is a fragmentary side elevation as viewed from the bottom in FIG. 1.

Means for releasably intercepting the opening provided in the eyelet component 10 of an eyelet type hitch, whereby to prevent connection of an associated latch component, broadly includes body means having two sections arranged to engage the opposite sides of the eyelet component with at least one of the sections intercepting one end of the eyelet opening to prevent entrance of the latch component, the eyelet opening being illustrated in FIG. 2 by broken lines 12, and locking means releasably securing the two sections together.

The body means is illustrated herein as an eyelet plug which includes base members 14 and 16 configured as plates larger in cross section than the diameter of the opening, and arranged to overlie and cover the opposite ends of the eyelet opening.

Base plate 14 centrally mounts a U-shaped padlock bail 18, as by welds 20, the bail including near its terminal ends typical locking ball detents 22. Base plate 16 is provided with a centrally located recess 24 configured to receive, as by a press-fit, a padlock body 26. The padlock body may further be welded to base 16 for increased strength. The locking mechanism includes conventional movable locking balls 28 arranged in registry within padlock bail receiving openings 30 for releasable engagement with the detents 22 in the bail. A key access opening 32 is provided through the base plate 16 in registry with padlock key block 34. This block is provided with a slot for receiving the appropriate key by which to release the locking balls 28 and open the padlock.

Means for maintaining the base plates in intercepting position over the eyelet opening, while minimizing lateral movement of the plates over the eyelet, is provided by hollow shielding sleeves 36 and 38 mounted to the base plates 14 and 16, respectively, about the padlock components 18 and 26. Sleeve 36 is configured to extend freely into the eyelet opening 12, with the base plate 14 abutting the eyelet component 10 and covering the opening 12.

Figure 3:
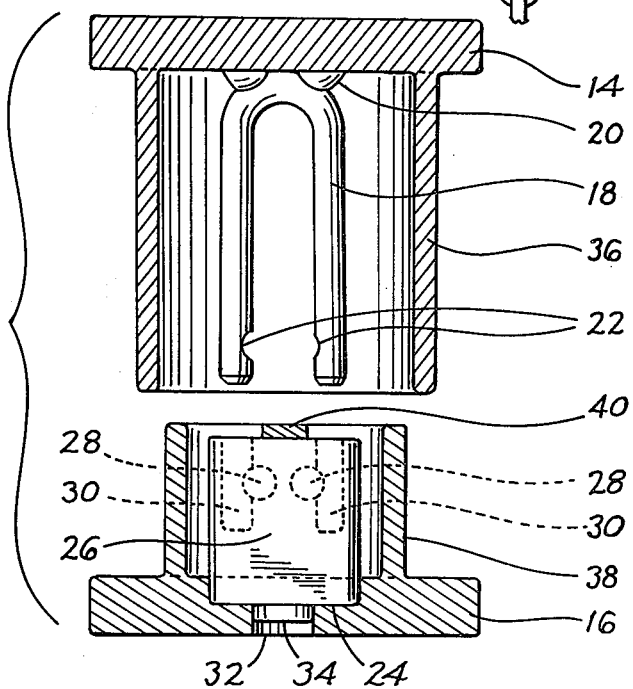
FIG. 3 is a sectional view taken along the lines 3—3 in FIG. 2, the components of the anti-theft device being separated to disclose structural details.

Base 16 mounts sleeve 38 which is also configured to extend freely into the eyelet opening 12 from the opposite side, and may be arranged, as in FIG. 3, to be receivable telescopically within the confines of the sleeve 36. This arrangement of the sleeves about the padlock components also protects the latter from cutting with a saw or torch, or other tampering when the padlock body is in locking engagement with its corresponding bail.

FIG. 3 illustrates mounting strap 40, which extends across the diameter of the sleeve 38 and is anchored to the sleeve and to the padlock body between the bail openings 30. The strap thus aids in preventing the padlock from being forced out of engagement with base 16 and also serves to guide the terminal ends of the bail into the bail openings 30.

For convenience and protection against inadvertent loss of the plug sections while not in use, the ends of a length of safety chain 42 may be anchored to the base members 14 and 16, to connect them together.

The operation of the eyelet type hitch anti-theft device of this invention is as follows: On a trailer to be prevented from unauthorized removal, one eyelet plug component is inserted into the eyelet opening from one end. The associated plug component is inserted into the eyelet opening from the opposite side so that shielding sleeve 38 is disposed to be received within the other sleeve 36. For this purpose, one component part is oriented rotationally so that the terminal, projecting ends of the bail 18 register with the bail openings 30 in the padlock. This is facilitated by rotating the components so that the bail ends straddle the strap 40. The component parts are then pressed together, thereby engaging locking balls 28 in the padlock body with locking ball detents 22 in the padlock bail. The eyelet opening of the hitch is thus intercepted, preventing any engagement of a latch coupler.

Inserting a key (not shown) through the key access opening 32 into key block 34 in the padlock body, and then turning the key, releases the balls 28 to move out of engagement with detents 22 and allows separation of the bail 18 and its associated plug section from the padlock body and its associated plug section. The two sections may be removed from the hitch eyelet opening, whereupon the latter is free to receive a latch component.

It will be apparent to those skilled in the art that various changes may be made in the size, shape, type, number and arrangement of parts described hereinbefore without departing from the spirit of this invention and the scope of the appended claims.

Having thus described my invention and the manner in which it may be used, I claim:

1. For use with an eyelet type trailer hitch wherein a latch component is removably insertable in the opening of an associated eyelet component, an anti-theft device for preventing connection of such latch component with such eyelet component, comprising:
   (a) a first imperforate eyelet-intercepting base member having a first imperforate base plate and a first elongated imperforate hollow shielding sleeve secured thereon, the first sleeve being configured to extend freely into the eyelet opening of an eyelet type trailer hitch,
   (b) a two component lock having a first lock component mounted on said first imperforate base plate within said imperforate hollow shielding sleeve,
   (c) a second eyelet-intercepting base member having a second base plate and a second elongated imperforate hollow shielding sleeve secured thereon, the second sleeve configured to extend freely into the eyelet opening of the eyelet type trailer hitch and to telescope freely with said first sleeve, and
   (d) the second lock component of said two component lock being mounted on said second base plate within said imperforate hollow shielding sleeve, a lock-operating portion of the second lock component being exposed at the outer surface of said second base plate through an opening therein for operating the lock, the second lock component closing the opening in the second base plate and thereby rendering the second base plate imperforate, the second lock component being arranged to engage the first lock component to releasably secure the two said base plates together whereby to prevent access to the two lock components contained within the interior of the shielding sleeves when the sleeves are in telescoped condition in the eyelet opening of an eyelet type trailer hitch.

2. For use with an eyelet type trailer hitch wherein a latch component is removably insertable in the opening of an associated eyelet component, an anti-theft device for preventing connection of such latch component with such eyelet component, comprising:
   (a) a first imperforate base plate,
   (b) an elongated bail component of a padlock secured to the first base plate and projecting perpendicularly therefrom, the padlock including conventional lock operating means,
   (c) a first elongated imperforate hollow shielding sleeve secured to the first base plate and surrounding said bail component, the first sleeve being configured to extend freely into the eyelet opening of an eyelet type trailer hitch,
   (d) a second base plate,
   (e) a padlock body component secured to the second base plate and projecting perpendicularly therefrom for releasable reception of said bail component, and padlock body component including lock operating mechanism and having a lock-operating portion exposed at the outer surface of said second base plate through an opening therein for operating the lock, the padlock body component closing the opening in the second base plate and thereby rendering the second base plate imperforate,
   (f) a second imperforate hollow shielding sleeve secured to the second base plate and surrounding said padlock body component, the second sleeve being configured to extend freely into the eyelet opening of the eyelet type trailer hitch and to telescope freely with the first sleeve, whereby to obscure the padlock components contained therein from view and prevent access to the two lock components within the shielding sleeves when the sleeves are in telescoped condition in the eyelet opening of an eyelet type trailer hitch, and thereby prevent unauthorized separation of said padlock components when they are locked together, and
   (g) guide means on one of the sleeves arranged to guide the bail component into locking engagement with the padlock body component.

* * * * *